United States Patent Office 2,885,746
Patented May 12, 1959

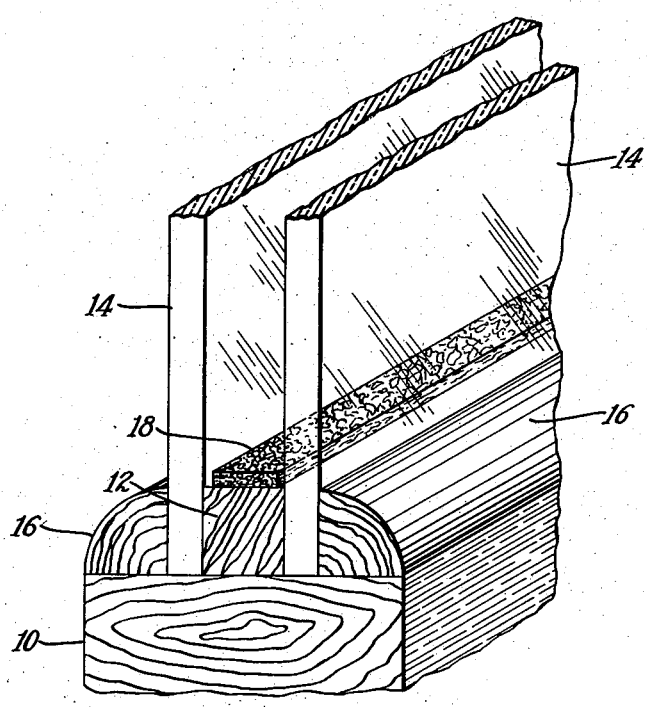

2,885,746

ARTICLES FOR REMOVING MOISTURE FROM ENCLOSED SPACES AND STRUCTURES INCLUDING THE ARTICLES

Franz Güra, Oberursel, Germany, assignor to B.B. Chemical Co., Boston, Mass., a corporation of Massachusetts Application May 31, 1957, Serial No. 662,775

Claims priority, application Germany June 13, 1956

5 Claims. (Cl. 20—56.5)

This invention relates to an article for removing the moisture from enclosed spaces and especially from spaces between the walls of double, or multi wall structures, for example windows, to avoid condensation on the insides of such walls.

Demoistening products are known which are used to remove moisture vapor from the spaces between double or multi pane windows. These are, for example, silica gel, calcium chloride, and the like. However, these products have the following disadvantages especially when they are used between double or multi pane windows: they are in powder, lump, or granular form rendering their application difficult. Moreover, the inner surfaces of the panes become soiled. When using silica gel in this form, the action of the sun can reverse the demoistening process, so that moisture is returned to the air and condensation on the glass panes occurs. Calcium chloride in lump or granular form deliquesces in taking up water, as is the case with most of the other hygroscopic substances. Moreover, it is difficult and complicated to bring these substances between two members so quickly that they do not lose their effectiveness, since demoistening material in granular or lump form has to be either filled into suitable containers such as a channel, box, tube or the like.

It is an object of the present invention to provide an article which is easily, quickly and securely positioned within a space and which remains in position to take up moisture without use of a container.

In accordance with the invention there is provided a demoistening insert comprising a layer of a paste containing demoistening substances.

In a preferred form of the invention, the layer of paste is formed as a ribbon-like strip, the width of which corresponds substantially to the width of the space between the wall members and the paste is compounded to adhere to the frame or spacer holding the wall members in spaced relation. The strip can advantageously be formed as it is applied to the spacers, for example, by extrusion from a collapsible tube provided with suitably formed extrusion opening or by other similar applying means. In order to obtain a fast application and a good bonding and to avoid condensation within the spaces even at temperatures varying from tropical temperatures to below the freezing point, the paste-like layer in accordance with the invention comprises a mixture of highly effective demoistening substances preferably irreversible at the range of temperatures encountered in use, with fillers and a paste vehicle which is unaffected by the water-removing chemicals.

The invention will be further described in connection with the attached drawing in which the figure is an angular view of a portion of a double pane window and frame showing the disposition of the demoistening insert along the spacing portion of the frame.

Double or multipane windows are well known and a variety of constructions providing such plural pane windows are known. The construction shown in the figure is a typical structure comprising a base frame 10, a central spacing member 12, panes of glass 14 on each side of the spacing member and retaining strips 16 at the intersection of the panes and the outer frame holding the panes 14 in position against the spacing member 12 and completing a seal at the edges of the panes. These windows may be constructed by securing a first retaining strip 16 along the base frame 10, by placing a first pane 14 with its edge portions abutting the first retaining strip 16, securing the spacer 12 in the outer frame 10 to hold the first pane 14 in position and thereafter placing the second pane 14 and second retaining strip 16 in place to define an enclosed space between the panes 14.

The demoistening insert 18 of the present invention may be positioned for removing moisture from the space between the panes at any convenient stage in the assembly of the window. That is, the insert 18 is composed of a pasty material compounded to have a consistency at which it will adhere to the spacer 12 or other surfaces within the space enclosed by the panes 14 so that it may be deposited on and adhered to, for example, the surface of the spacer 12 prior to assembling the spacer 12 in the window or may be applied to the surface of the spacer 12 after the spacer has been placed in the outer frame 10 to hold the first pane 14 in position. In some structures it is also possible to place the demoistening insert 18 in position after both panes 14, spacer 12 and retaining strips 16 have been secured in the outer frame 10 by introducing the strip 18 through a special opening in the frame 10 and spacer 2.

The insert strip 18 may be preformed to any desired cross section and kept in a suitable moistureproof container until needed for application to an enclosed space. Preferably, however, the insert 18 is extruded as needed directly on the surface, e. g. the inner surface of the spacer 12, to which it is to be adhered. Any convenient extrusion means may be used such as a collapsible tube, an extrusion cylinder or the like provided with an extrusion orifice for forming a strip with desirable cross sectional thickness and shape. With such extrusion devices somewhat softer and more adhesive compositions may be employed than where the strip is preformed. A variety of cross sections may be used such as the simple flat strip shown in the figure or T-shaped, ribber, channeled, or other shapes.

The paste from which the insert 18 is formed is a mixture of a hygroscopic material, a filler and a relatively high viscosity liquid vehicle for binding the hygroscopic material and filler together into a suitable pasty adhesive consistency. Where wide extremes in temperatures are encountered as in windows, it is important that the hygroscopic agent take up moisture irreversibly under the temperature conditions encountered in order to prevent evolution of absorbed moisture with the possibility of condensation if the temperature falls suddenly. Suitable hygroscopic agents include phosphorous pentoxide, calcium chloride, calcium oxide, magnesium oxide, barium oxide, aluminum oxide, fused potassium hydroxide and in some instances dehydrated silica gel. These substances, preferably in finely divided state, are combined with the binding vehicle and with a filler, ordinarily an absorptive or adsorptive filler. The purpose of the filler is to give a desired consistency to the paste and where necessary to maintain this consistency by taking up any liquid formed as, for example, calcium chloride solution resulting from absorption of moisture by calcium chloride. Useful fillers include diatomaceous earth, silica gel, silicic acid, aluminum silicate, alumina, clay, and other known absorbing agents.

The hygroscopic material and filler are combined with a proportion of a binding vehicle to form a paste having a consistency for convenient application and at least limited clinging or adhesion to the surfaces within the multi walled structure such as the plural pane window. The skilled chemist will have no difficulty in determining suitable proportions for combining the solid hygroscopic and filler materials with the binding vehicle to provide a consistency suitable for extrusion and adapted to remain in place within the space defined by the walls or panes. The binding vehicle should be a relatively high viscosity, substantially nonvolatile liquid and should be selected to be unaffected by the particular hygroscopic agent employed. Saturated hydrocarbon materials are particularly satisfactory and include such materials as low molecular weight polyisobutylene, polyisobutene, and polybutene. Petroleum jelly, various hydrocarbon residues from fractionation or cracking of petroleum, and other relatively heavy petroleum hydrocarbon oils may be used. Two or more of these materials may be combined in blends designed to give desired viscosity. Liquid or low melting cumarone and indene resins may also be used. Other binder materials useful with hygroscopic agents include substantially anhydrous glycerin, ethylene glycol, diethylene glycol and triethylene glycol.

The following examples are given to aid in understanding the invention, but it is to be understood that the invention is not restricted to the specific materials, proportions, or conditions recited in the examples:

*Example I*

A pasty material was prepared including the following materials in the following proportions:

| | Parts by weight |
|---|---|
| Phosphorus pentoxide | 4 |
| Polyisobutylene | 4 |
| Paraffin oil | 2 |
| Aluminum silicate | 1 |
| Silicic acid | 1 |

The paste was prepared by mixing together the polyisobutylene and paraffin oil in a WP mixer to form a smooth viscous liquid blend and thereafter adding the phosphorous pentoxide, aluminum silicate and silicic acid in finely divided condition and working the mass to form a uniform mixture. The mixture had a consistency somewhat stiffer than toothpaste and was introduced into a collapsible tube having a slot type orifice. A partially assembled multi pane window, in which one retainer strip, one pane of glass and a spacer strip had been secured in an outer frame, was prepared. A strip of the pasty material approximately 1/8" in thickness and of the width of the spacer was extruded along the inner surface of the spacer and adhered thereto. The second pane of the window and the second retainer strip were promptly secured in place.

This double window showed no condensation on its interior in extremes of temperature ranging from below freezing to temperatures as high as 100° F.

*Example II*

A paste was made by stirring together the following ingredients until the mixture was uniform:

| | Parts by weight |
|---|---|
| Calcium chloride | 4 |
| Silicic acid | 2 |
| Diatomaceous earth | 1 |
| Glycerin | 4 |

This pasty material was extruded as a strip along the inner surface of a spacer in the preparation of a double pane window as described in Example I. The completed window showed no evidence of condensation on its interior surfaces during use in which it was subjected to temperatures ranging from below freezing to 100° F. The paste did not become liquid during use.

Having thus described my invention, what I claim as new and desire to secure by Letters Patent of the United States is:

1. A readily deformable, normally shape-retaining paste for removing moisture from closed spaces and having a consistency for extrusion by hand pressure extruding devices as a strip which is self-adhesive to structural materials, said paste comprising an intimate mixture of solid, insoluble, finely divided, absorbing, mineral fillers, a non-volatile, high viscosity liquid binder, and a substantial proportion of a hygroscopic agent which takes up moisture irreversibly under the temperature conditions encountered in use, the proportion of said filler being sufficient to hold said paste in normally shape-retaining condition after said hygroscopic agent has taken up moisture.

2. As an article of manufacture, a demoistening insert comprising a readily deformable, normally shape-retaining strip of paste self-adhesive to structural materials comprising an intimate mixture of solid, insoluble, finely divided, absorbing, mineral fillers, a non-volatile, high viscosity liquid binder, and a substantial proportion of a hygroscopic agent which takes up moisture irreversibly under the temperature conditions encountered in use, the proportion of said filler being sufficient to hold said paste in normally shape-retaining condition after said hygroscopic agent has taken up moisture.

3. As an article of manufacture, a demoistening insert comprising a relatively thin cross section strip of readily deformable, normally shape-retaining paste self-adhesive to structural materials and comprising an intimate mixture of solid insoluble, finely divided, absorbing, mineral fillers, a substantial proportion of a hygroscopic agent taking up water irreversibly under the temperature conditions encountered in use and a high viscosity non-volatile liquid binder substantially inert to said hygroscopic agent which takes up moisture irreversibly under the temperature conditions encountered in use, the proportion of said filler being sufficient to hold said paste in normally shape-retaining condition after said hygroscopic agent has taken up moisture.

4. A window including spaced panes, edge members cooperating with said panes to define an enclosed space between said panes, and a strip of hygroscopic paste lying along and adhering itself in fixed relation to the surface of an edge member within said enclosed space, said hygroscopic paste being a readily deformable, normally shape-retaining intimate mixture of solid insoluble, finely divided, absorbing, mineral fillers, a non-volatile, high viscosity liquid binder, and a hygroscopic agent which takes up moisture irreversibly under the temperature conditions encountered in use, the proportion of said filler being sufficient to hold said paste in normally shape-retaining condition after said hygroscopic agent has taken up moisture from said enclosed space.

5. A window including spaced panes, edge members cooperating with said panes to define an enclosed space between said panes, and a substantially uniform cross-section strip of hygroscopic paste lying along and adhering itself in fixed relation to the surface of an edge member within said enclosed space, said hygroscopic paste being a readily deformable, normally shape-retaining intimate mixture of solid insoluble, finely divided, absorbing, mineral fillers, a non-volatile, high viscosity liquid binder and a hygroscopic agent substantially irreversible under temperature conditions encounted in use, the proportion of said filler being sufficient to hold said paste in normal shape-retaining condition after said hygroscopic agent has taken up moisture from said enclosed space.

References Cited in the file of this patent

UNITED STATES PATENTS

| 2,025,770 | Parkinson et al. | Dec. 31, 1935 |
| 2,163,901 | Walker et al. | June 27, 1939 |
| 2,257,680 | Haux | Sept. 30, 1941 |
| 2,284,981 | Martin | June 2, 1942 |